United States Patent
Wachi

(10) Patent No.: US 7,829,604 B2
(45) Date of Patent: Nov. 9, 2010

(54) GOLF BALL

(75) Inventor: Toshiro Wachi, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 455 days.

(21) Appl. No.: 11/730,801

(22) Filed: Apr. 4, 2007

(65) Prior Publication Data

US 2008/0249251 A1  Oct. 9, 2008

(51) Int. Cl.
 A63B 37/06 (2006.01)
 A63B 37/00 (2006.01)
 C08L 9/00 (2006.01)

(52) U.S. Cl. .................. 521/45; 525/193; 525/236; 473/371; 473/372; 473/377

(58) Field of Classification Search ............... None
 See application file for complete search history.

(56) References Cited

U.S. PATENT DOCUMENTS

| | | | |
|---|---|---|---|
| 5,350,804 A * | 9/1994 | Takita et al. | 525/104 |
| 5,589,546 A * | 12/1996 | Hiraoka et al. | 525/193 |
| 2002/0160861 A1 | 10/2002 | Wachi | |
| 2003/0119605 A1 * | 6/2003 | Hirau et al. | 473/371 |
| 2003/0148824 A1 | 8/2003 | Wachi | |
| 2005/0171221 A1 * | 8/2005 | Danner et al. | 521/41 |

FOREIGN PATENT DOCUMENTS

| JP | 60-194968 A | 10/1985 |
|---|---|---|
| JP | 61-94666 A | 5/1986 |
| JP | 63-212378 A | 9/1988 |
| JP | 2652502 B2 | 5/1997 |
| JP | 2001-25515 A | 1/2001 |
| JP | 2002-65895 A | 3/2002 |
| JP | 2002-102388 A | 4/2002 |
| JP | 2002-204837 A | 7/2002 |
| JP | 2002-219192 A | 8/2002 |
| JP | 2002-302570 A | 10/2002 |
| JP | 2004-49700 A | 2/2004 |

* cited by examiner

*Primary Examiner*—David Buttner
(74) *Attorney, Agent, or Firm*—Sughrue Mion, PLLC

(57) ABSTRACT

The invention provides a golf ball composed of a hot-molded material obtained by vulcanizing a rubber composition made primarily of a base rubber and an unsaturated carboxylic acid or salt thereof, wherein the rubber composition additionally includes a vulcanized rubber powder from which soluble ingredients have been removed by liquid washing. The golf ball of the invention is able to increase the hardness (deflection) of the core and has an excellent durability, in addition to which it effectively re-uses vulcanized rubber powder that is a waste material and so is industrially beneficial by lowering manufacturing costs and reducing the burden on the environment.

9 Claims, No Drawings

GOLF BALL

BACKGROUND OF THE INVENTION

The present invention relates to a solid golf ball, particularly a solid golf ball having a solid core, such as a two-piece golf ball or a multi-piece golf ball having three or more pieces.

The hardness (deflection) of the core material is known to play a large role in the feel of a solid golf ball on impact. By controlling the hardness of the solid core, it is possible to achieve the desired feel on impact in golf balls manufactured from existing materials. Recently, there appear to be quite a few golf balls having a plurality of intermediate layers and cover layers. By controlling the hardnesses of these respective layers, the abrasions that tend to arise between one layer and another (where they mutually adhere) can be reduced.

To manufacture golf balls of excellent durability without compromising the coefficient of restitution or the feel on impact, JP No. 2652502 describes the inclusion of a vulcanized rubber powder in a golf ball having a one-layer construction or in the core of a golf ball having a construction of two or more layers that includes a cover and a core of one or more layer.

However, one cannot expect to achieve a higher hardness (lower deflection) in a crosslinked rubber body by thus "increasing the durability without compromising the feel on impact." This suggests that the ball hardness itself inevitably ends up being suppressed, with the ball having too soft a feel and not achieving the desired initial velocity, resulting in a golf ball that lacks a sufficient distance.

JP-A 2002-102388 describes a way of holding down the resilience by grinding up the cores of discarded golf balls, having the resulting material take up moisture, then adding the moisture-bearing material to golf ball cores.

However, when this method is used to hold down the resilience, the moisture inhibits the formation of a crosslinked structure in the rubber, which suggests that the desired hardness and initial velocity may be unattainable. Moreover, when the golf ball core itself has absorbed moisture, the properties of the rubber tend to be lost, which may also be a durability-lowering factor.

In addition, golf balls obtained by compounding substances such as rubber powder, cork, wood chips, powdered rice chaff in order to reduce the environmental impact from the reuse of waste materials are described in, for example, JP-A 2002-65895, JP-A 2001-25515, JP-A 2002-204837, JP-A 2002-302570, JP-A 2002-219192, JP-A 2004-49700, JP-A 63-212378, JP-A 61-94666 and JP-A 60-194968.

However, such prior art is not conductive to obtaining golf balls having an excellent durability, a core hardness that can be controlled with minimal decline in the initial velocity, and an excellent feel on impact.

SUMMARY OF THE INVENTION

It is therefore an object of the invention to provide a golf ball which has an excellent durability, which has a hardness (deflection) that can be controlled without lowering the initial velocity and provides an excellent feel on impact, and which moreover enables the reuse of waste materials and is thus beneficial both in terms of manufacturing costs and in lowering the burden on the environment.

After conducting extensive investigations, the inventor has discovered that when a rubber composition obtained by blending as the essential ingredients a base rubber and an unsaturated carboxylic acid or a salt thereof is vulcanized and the resulting hot-molded article is used as a core or other component in a golf ball, by including in the rubber composition a vulcanized rubber powder from which soluble ingredients have been removed by liquid washing, it is possible to increase the hardness of the core (decrease the deflection) or the like, and to impart the golf ball with an excellent durability and a good feel on impact. Moreover, it is possible in such cases to reuse vulcanized rubber powder that is a waste material, thus enabling the production of industrially beneficial golf balls having reduced production costs and a lower impact on the environment.

That is, the inventor has found that when a vulcanized rubber powder from which soluble ingredients such as unsaturated carboxylic acids have been removed by carrying out a liquid wash is added as a core hardness regulator, particularly in golf balls made up of a core enclosed by a cover of one or more layer, it is possible to adjust the core hardness without compromising the durability. As used herein, "liquid wash" refers to the extraction of unsaturated carboxylic acids and the like from a vulcanized rubber powder by immersing the vulcanized rubber powder in a liquid such as water or alcohol. Liquid-washed vulcanized rubber powder is rubber that no longer has rubber elasticity (resilience). In other words, in vulcanized rubber powder from which the soluble ingredients have been removed, the rubber has lost its inherent high resilience. The loss of rubber resilience is presumably due to the increased loss of energy on impact resulting from the somewhat inferior adhesion by such liquid-washed vulcanized rubber to the matrix rubber. When cores formed from a rubber composition containing a liquid-washed vulcanized rubber powder are compared with cores formed from rubber compositions containing a vulcanized rubber powder that has not been liquid-washed, the former cores have a better durability.

Accordingly, the invention provides a golf ball composed of a hot-molded article obtained by vulcanizing a rubber composition made primarily of a base rubber and an unsaturated carboxylic acid or salt thereof, wherein the rubber composition additionally includes a vulcanized rubber powder from which soluble ingredients have been removed by liquid washing. The vulcanized rubber powder has a particle size of preferably up to 1,000 μm. The vulcanized rubber powder has a moisture content when added to the base rubber of preferably up to 600 ppm. Water is preferably used as the liquid.

In golf balls according to the prior art, the hardness of the core is generally controlled by using a co-crosslinking agent or controlling the moisture content. However, in the golf balls formed according to the present invention, the hardness (deflection) of the core can be controlled without changing the material proportions or the moisture content, and without lowering the initial velocity of the ball.

The present invention enables golf balls having an excellent durability and an excellent feel on impact to be manufactured. Moreover, by enabling the re-use of waste materials, the invention is able to provide golf balls which have the additional advantage of reducing manufacturing costs and the burden on the environment.

DETAILED DESCRIPTION OF THE INVENTION

As noted above, the golf ball of the invention is a golf ball composed of a hot-molded article obtained by vulcanizing a rubber composition made primarily of a base rubber and an unsaturated carboxylic acid or salt thereof, wherein the rubber composition additionally includes a vulcanized rubber powder from which soluble ingredients have been removed by liquid washing.

The rubber material for obtaining the vulcanized rubber powder used in the invention is not subject to any particular limitation. The use of a rubber material commonly employed in golf balls is preferred. The use of a rubber material formulated from cis-1,4-polybutadiene as the base rubber, together with an unsaturated carboxylic acid, an unsaturated carboxylic acid metal salt or the like is especially preferred.

Examples of the unsaturated carboxylic acid include acrylic acid, methacrylic acid, maleic acid and fumaric acid. Acrylic acid and methacrylic acid are especially preferred. Examples of unsaturated carboxylic acid metal salts include zinc salts and magnesium salts. Of these, the use of zinc acrylate is preferred.

Although it is possible to practice the invention using, as the vulcanized rubber material to be liquid washed, a rubber powder obtained from discarded golf balls or a rubber powder generated from, for example, the centerless grinding of golf ball solid cores, given the trouble entailed by rendering discarded product into a powder, it is more effective to use a rubber powder generated during grinding.

In cases where use is made of a rubber powder generated by centerless grinding, the rubber powder may be one which is obtained by, in the step in which a solid core is ground with a grinding wheel while applying water to the surface of the core, letting the solution containing the generated rubber powder stand for a length of time sufficient to allow soluble ingredients such as acrylic acid to be extracted from the rubber powder by the liquid, then separating off the rubber with a filtration device or the like.

The grinding wheel used for grinding the cores may have a grit of from 10 to 300, preferably from 20 to 200, and more preferably from 50 to 150. By suitably changing the grinding wheel, it is possible to suitably control the degree of roughness at the surface where the core material is ground and the particle size of the rubber powder used in the invention.

The rubber powder used in the invention is not limited to the above. For example, use may also be made of discarded golf balls. When discarded balls or the like are utilized, it is preferable to use only the rubber-based material portion of the golf ball, in which case the rubber-based material is preferably reduced to about the particle size of the powder described below.

In the practice of the invention, the above-described untreated vulcanized rubber powder is washed with a liquid to remove soluble ingredients from the powder. The liquid used for such washing is exemplified by water and surfactant solutions containing alcohol as the solvent. Of these liquids, to avoid the risk of undesirable effects on the golf ball core performance by residual ingredients such as surfactants and to hold down costs, the use of water is preferred.

A method such as that of spraying the above liquid onto the untreated vulcanized rubber powder may be employed for liquid washing. It is preferable to use a method in which the vulcanized rubber powder is immersed in a liquid, and especially water. The amount of liquid may be suitably selected, but is preferably at least 5 liters, more preferably between 5 and 50 liters, and most preferably between 5 and 20 liters, per 1,000 grams of powder.

If the amount of liquid is lower than that specified here, it may not be possible to fully extract the soluble ingredients present in the rubber and on the surface. On the other hand, if the amount of liquid is higher, filtration may take too long, possibly lowering the production efficiency.

The temperature for carrying out extraction is preferably between 10 and 40° C., more preferably between 15 and 35° C., and most preferably between 20 and 30° C. At a temperature lower than the above temperature, suitable extraction may not be carried out and a substantial amount of soluble ingredients may remain within the rubber and at the surface. On the other hand, at a temperature higher than the above temperature, the addition of a heating step will increase production costs, which is economically undesirable.

The time required for extraction is preferably between 10 minutes and 24 hours, more preferably between 1 and 12 hours, and most preferably between 1 and 2 hours.

The method used during extraction is not subject to any particular limitation. For example, extraction may be carried out under stirring, which may shorten the extraction time.

The soluble ingredients in the vulcanized rubber that are removed by the above liquid include water-soluble unsaturated carboxylic acids such as acrylic acid and methacrylic acid, as well as salts thereof, and also other water-soluble monomers and polymers.

After the vulcanized rubber powder has been liquid washed as described above, it is desirable to dry the liquid-washed powder. Any suitable method may be used for drying, although it is preferable for several reasons to dry the rubber separated off by filtration using a dryer equipped with a stirrer. The reasons are as follows: (i) to prevent the rubber from agglomerating, (ii) to dry the rubber powder evenly and uniformly, and (iii) to prevent scorching and dust explosions from arising.

The vulcanized rubber powder obtained after drying in the above drying step has a moisture content of preferably not more than 600 ppm, and more preferably not more than 400 ppm. By adjusting the moisture content of the vulcanized rubber powder to 600 ppm or below, it is possible to maintain the resilience of the core being manufactured and to enhance the durability of the golf ball to change over time.

The temperature during drying is preferably between 105 and 160° C., more preferably between 110 and 140° C., and even more preferably between 120 and 125° C. The time required for drying is preferably at least 20 minutes, more preferably between 30 minutes and 3 hours, and even more preferably between 1 and 2 hours.

When the temperature and time in the above drying step fall outside the above ranges, there is a possibility that the vulcanized rubber powder cannot be sufficiently dried and that the powder material may deteriorate.

No particular limitation is imposed on the particle diameter of the vulcanized rubber powder thus obtained. In terms of the screen mesh size, the particle diameter is preferably not more than 1,000 μm, more preferably between 25 and 800 μm, and even more preferably between 25 and 400 μm. At a rubber powder particle diameter in excess of 1,000 μm, dispersion of the rubber powder during kneading may worsen and the durability of the finished golf ball may worsen. On the other hand, if the rubber powder particle diameter is too small, the desired hardness may not be achievable. Moreover, it may not be possible to increase the amount of waste material used, thus diminishing the cost-reducing and environmental impact-lowering effects.

The means for obtaining a powder having such a particle size is exemplified by a method in which the dried rubber powder is applied to a sieve to obtain a rubber powder within a predetermined particle size range. In such a case, the screen mesh may be suitably selected according to the particle size of the rubber powder to be recovered, although it is desirable to use rubber powder having a particle size in a range of preferably 75 to 1,000 μm, and more preferably 250 to 425 μm.

Sieves have the ability, when arranged in a vertical stack with the coarsest mesh at top and progressively finer meshes below, to collect at one time discrete powders of the respective particle diameters. Those powders which are too large for use as the material of the invention are further reduced to a smaller size or, as the case may be, discarded.

In the practice of the invention, the rubber powder obtained through the above-described steps is preferably added as a hardness modifying agent when the rubber is kneaded.

The golf ball of the invention is a one-piece solid golf ball, a two-piece solid golf ball or a multi-piece solid golf ball having two or more pieces. The above-described liquid-washed heated rubber powder is added to the hot-molded article serving as the ball in a one-piece solid golf ball, the hot-molded article serving as the solid core in a two-piece solid golf ball, or the hot-molded article serving as the solid core and/or the intermediate layer in a multi-piece solid golf ball. In the latter case, it is especially preferable for the liquid-washed heated rubber powder to be added to the hot-molded article serving as the solid core.

Here, the hot-molded article is obtained by vulcanizing a rubber composition formulated from, as the essential ingredients, a base rubber and an unsaturated carboxylic acid or a salt thereof. The base rubber is not subject to any particular limitation, provided it is a rubber material which can be used in golf balls. A polybutadiene synthesized using a rare-earth catalyst having a cis-1,4 bond content of at least 60% is preferred.

The rare-earth catalyst is preferably a neodymium catalyst. Also, it is preferable that polybutadiene have a 1,2-vinyl bond content of not more than 2%.

Illustrative examples of the unsaturated carboxylic acid include acrylic acid, methacrylic acid, maleic acid and fumaric acid. Acrylic acid and methacrylic acid are especially preferred. Illustrative examples of unsaturated carboxylic acid metal salts include zinc salts and magnesium salts. Of these, zinc acrylate is preferred.

The unsaturated carboxylic acid or salt thereof is included in an amount, per 100 parts by weight of the base rubber, of preferably from 5 to 30 parts by weight, and more preferably from 10 to 20 parts by weight.

The rubber composition for forming the above-described hot-molded article is preferably one which additionally includes, per 100 parts by weight of the base rubber, from 10 to 60 parts by weight, and especially from 20 to 40 parts by weight, of an inorganic filler such as zinc oxide, calcium carbonate or barium sulfate, and from 0.1 to 1.0 part by weight, and especially from 0.4 to 0.6 part by weight, of an organic peroxide such as dicumyl peroxide, 1,1-bis(t-butylperoxy)-3,5,5-trimethylcyclohexane or α,α'-bis(t-butylperoxy)diisopropylbenzene. In addition, other ingredients such as elemental sulfur, organosulfur compounds such as pentachlorothiophenol and/or a metal salt thereof and antioxidants may be included in the necessary amounts.

A hot-molded article such as a solid core may be manufacturing using the above-described rubber composition. Vulcanization may be carried out at a temperature of generally from 150 to 170° C. for a period of generally from 10 to 20 minutes.

In the practice of the invention, the above-described liquid-washed vulcanized rubber powder is added to the rubber composition for obtaining a hot-molded article, and a hot-molded article such as a solid core is formed.

The rubber powder may be added in an amount, per 100 parts by weight of the base rubber, of preferably from 0.1 to 50 parts by weight, more preferably from 0.2 to 30 parts by weight, and even more preferably from 0.5 to 10 parts by weight. With the addition of less than 0.1 part by weight of the rubber powder, the cost-reducing effect decreases. On the other hand, with the addition of more than 50 parts by weight, the ball may have a lower durability. At an amount of addition above 30 parts by weight, the rubber mixing operation during manufacture tends to gradually worsen as the amount of addition increases.

Apart from the use of the above-described liquid-washed vulcanized rubber powder, the golf ball of the invention can be manufactured by known methods using known materials suitable for the type of golf ball. For example, the intermediate layer for a multi-piece solid golf ball may be formed of a resin material or a rubber-based material. Illustrative examples of resins that may be used to form the intermediate layer include ionomer resins, polyester elastomers, polyamide elastomers, styrene elastomers, polyurethane elastomers, olefin elastomers and mixtures thereof. When the intermediate layer material is a rubber-based material, the above-described liquid-washed vulcanized rubber powder may be added to the intermediate layer material.

Illustrative examples of the cover material resin include ionomer resins, polyester elastomers, polyamide elastomers, styrene elastomers, polyurethane elastomers, olefin elastomers, and mixtures thereof.

Dimples are formed in the golf ball by a conventional method. The number of dimples may be suitably selected according to the ball construction and intended use, although a number in a range of about 250 to about 500 is preferred.

The mold used for obtaining the golf ball is preferably of a type that is commonly used for forming cores. The intermediate layer and cover may likewise be manufactured in a manner customary to the art. Moreover, dimple-forming features may be provided on the parting surface of the mold.

EXAMPLES

Examples of the invention and Comparative Examples are given below by way of illustration, and not by way of limitation.

Examples and Comparative Example

A vulcanized rubber obtained by mixing the ingredients shown in Table 1 and vulcanization was ground, and a dispersion obtained by dispersing about 3 kg of the rubber powder having a particle size of 1,500 µm or less thus generated in 300 L of water was left to stand for 1 hour at room temperature. Extraction in this way of the unsaturated carboxylic acid resulted in a dispersion having a pH of less than 6.5. This dispersion was separated by filtration into rubber and water.

Drying was carried out at 120° C. for 2 hours in a dryer having a stirring ability, thereby drying the 3 kg of rubber from a moisture content of 25 wt % down to a moisture content of 200 ppm. This rubber powder included flash and the like from the vulcanization process; the particle size of such flash was large. In vulcanized rubber having a large particle size such as this, the unsaturated carboxylic acid sometimes cannot be fully extracted. Hence, the powder was classified using a sieve having a mesh size of 0.4 mm.

TABLE 1

| | |
|---|---|
| cis-1,4-Polybutadiene | 100 parts by weight |
| Zinc oxide | 30 parts by weight |
| Zinc acrylate | 20 parts by weight |
| Antioxidant | 0.1 part by weight |
| Calcium carbonate | 0.1 part by weight |
| Dicumyl peroxide | 0.6 part by weight |

Details concerning these ingredients are provided below.

Polybutadiene (produced by JSR Corporation under the trade name "BR01")

Zinc oxide (produced by Sakai Chemical Industry Co., Ltd. under the trade name "Nanofine-50")

Zinc acrylate (Nihon Jyoryu Kogyou Co., Ltd.)

Antioxidant (produced by Ouchi Shinko Chemical Industry Co., Ltd. under the trade name "Nocrac NS-6")

Calcium carbonate (Shiraishi Calcium Kaisha, Ltd.)

Dicumyl peroxide (produced by NOF Corporation under the trade name "Percumyl D")

Next, the vulcanized rubber powder obtained above was added to the rubber composition of the formulation shown in Table 1 in an amount of 1, 3, 5, 10 or 15 parts by weight per 100 parts by weight of cis-1,4 polybutadiene. The resulting mixture was kneaded, then vulcanized in a mold at 150° C. for 10 minutes, thereby producing solid cores having a diameter of 39.0 mm. The performance of the cores was evaluated. Those results are shown in Table 2 below.

In the examples, the same material was used as both the vulcanized rubber powder and the core material.

TABLE 2

|  | Comparative Example | Example | | | |
|---|---|---|---|---|---|
| Amount of vulcanized rubber powder added (pbw) | 0 | 3 | 5 | 10 | 15 |
| Core deflection (mm) | 4.26 | 4.12 | 4.03 | 3.96 | 3.86 |
| Initial velocity (m/s) | 77.40 | 77.39 | 77.41 | 77.48 | 77.55 |

Core deflection: Deflection (mm) of core when placed on a hard plate and compressed under a final load of 1,275 N (130 kgf) from an initial load of 98 N (10 kgf).
Initial velocity: Initial velocity at 1,376 rpm, as measured by a USGA-type initial velocity measuring instrument.

The results in Table 2 showed that the hardness increased in proportion to the amount of water-washed vulcanized rubber powder added, without a loss in the initial velocity. The above hardness and initial velocity values were measured in the core state.

The invention claimed is:

1. A golf ball comprising a hot-molded material obtained by vulcanizing a rubber composition made primarily of a base rubber and an unsaturated carboxylic acid or salt thereof, wherein the rubber composition additionally includes a vulcanized rubber powder from which soluble ingredients have been removed by liquid washing for between 10 minutes and 24 hours,
wherein
the vulcanized rubber powder is a rubber material formulated from cis-1,4-polybutadiene as the base rubber, together with an unsaturated carboxylic acid, and/or an unsaturated carboxylic acid metal salt,
the vulcanized rubber powder has a moisture content when added to the base rubber of up to 600 ppm, and
the vulcanized rubber powder is dried at between 120 and 160° C. for at least 20 minutes after the vulcanized rubber powder is liquid washed.

2. The golf ball of claim 1, wherein the vulcanized rubber powder has a particle size of up to 1,000 μm.

3. The golf ball of claim 1, wherein the rubber powder has a particle size of a range of 75 to 1,000 μm.

4. The golf ball of claim 1, wherein the liquid is water.

5. The golf ball of claim 1, wherein the rubber powder is obtained by grinding a core material with a grinding wheel having a grit of from 10 to 300.

6. The golf ball of claim 1, wherein the amount of liquid used in the liquid washing is at least 5 liters, per 1,000 grams of the rubber powder.

7. The golf ball of claim 1, wherein the temperature for carrying out extraction of the soluble ingredients present in the rubber and on the surface is set to the range of from 10 to 40° C.

8. The golf ball of claim 1, wherein the rubber powder is added in an amount of from 0.1 to 50 parts by weight, per 100 parts by weight of the base rubber.

9. The golf ball of claim 1, wherein the liquid-washed powder is dried by a dryer equipped with a stirrer after the vulcanized rubber powder is liquid washed.

* * * * *